July 21, 1970     R. L. NEWMAN     3,521,356
DISPENSER FOR DENTAL FILLING MATERIAL
Filed Sept. 27, 1968     2 Sheets-Sheet 2
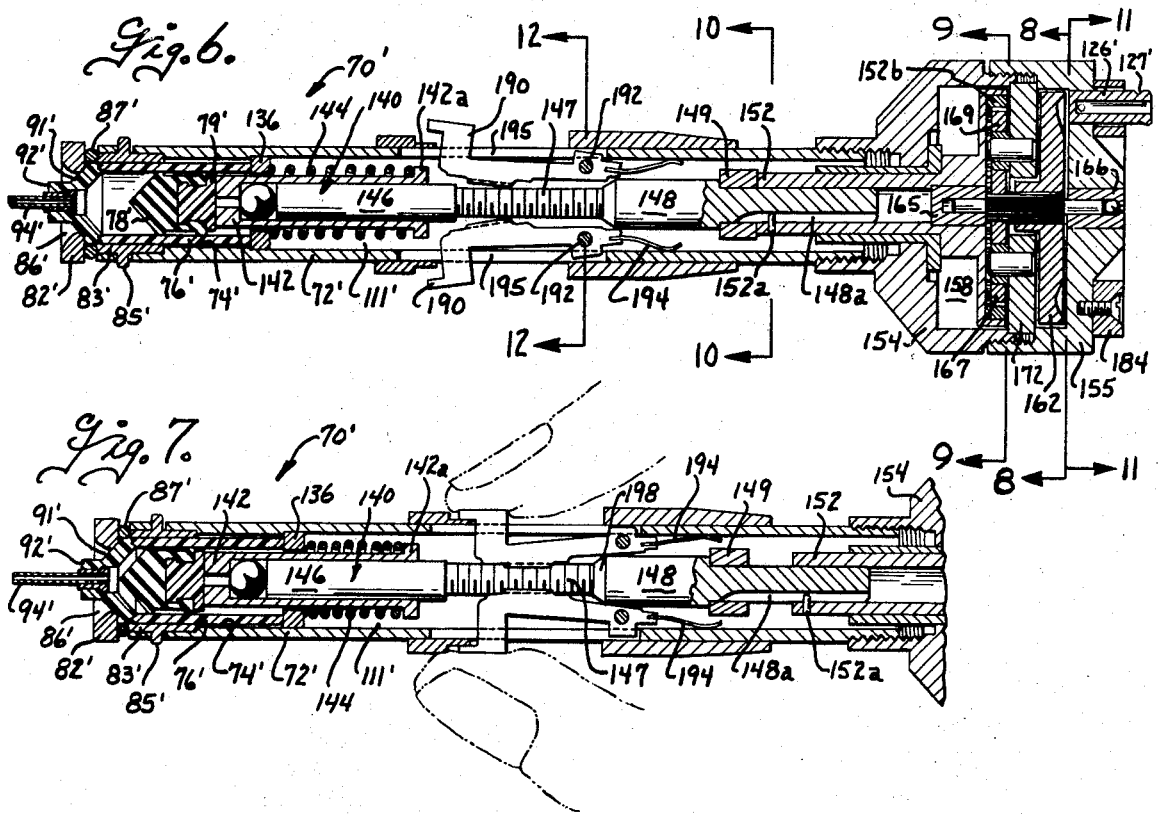
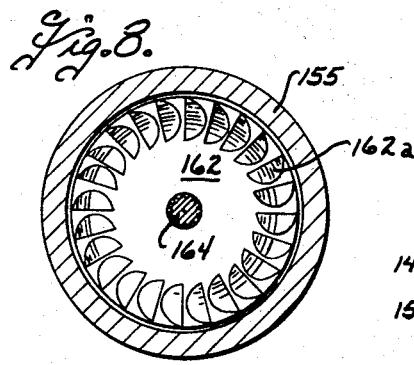
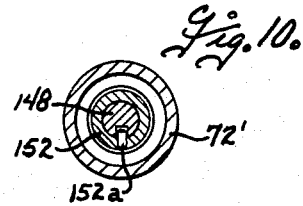
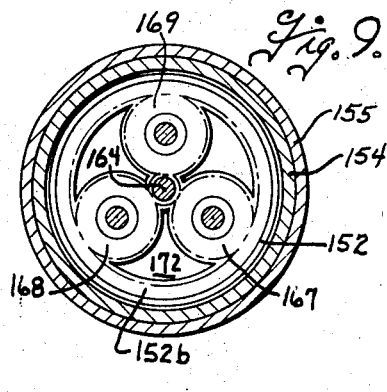
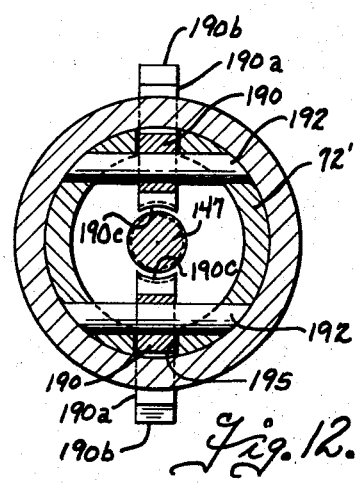
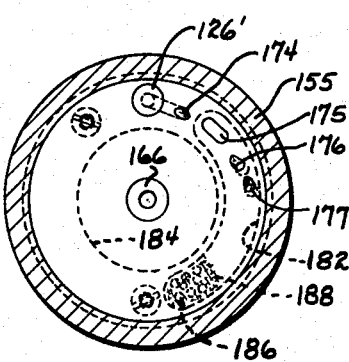
Inventor
Roy L. Newman
by
McCanna, Mansbach, Pillote & Muir
Attorneys

United States Patent Office 3,521,356
Patented July 21, 1970

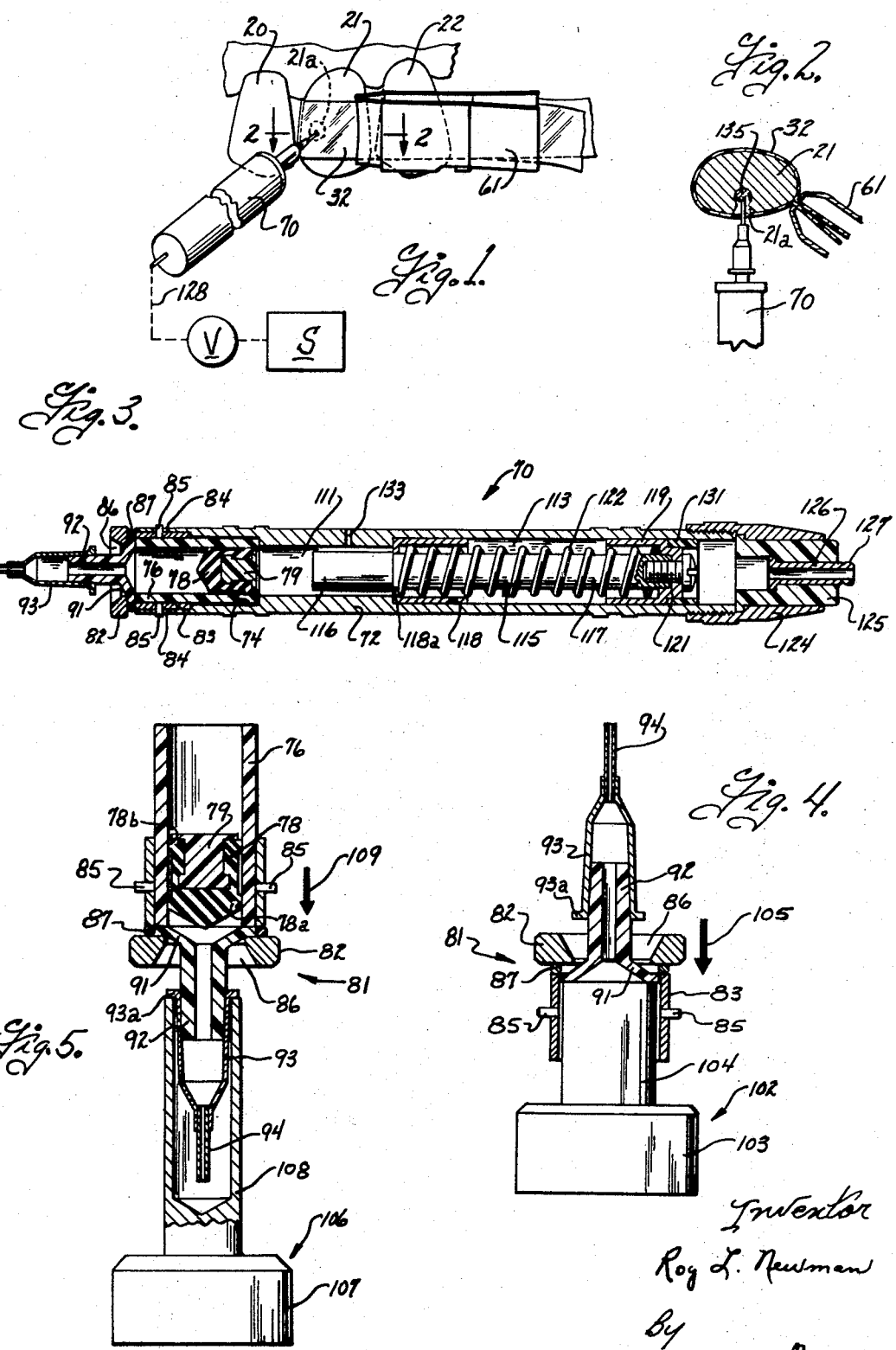

3,521,356
DISPENSER FOR DENTAL FILLING MATERIAL
Roy L. Newman, 1023 Lundvall Ave.,
Rockford, Ill. 61107
Continuation-in-part of application Ser. No. 538,459,
Mar. 23, 1966. This application Sept. 27, 1968, Ser.
No. 763,291
Int. Cl. A61c 5/04
U.S. Cl. 32—60                           8 Claims

ABSTRACT OF THE DISCLOSURE

Two embodiments of the dispenser are illustrated. Both have a plunger which is advanced to dispense the dental filling material from a cartridge through a barrel. The cartridge is removable and the filling material may be prepared therein. In one embodiment the plunger is advanced by air pressure applied against the plunger; in the other, the plunger is mechanically advanced by a turbine driven by air under pressure.

CROSS REFERENCE

This application is a continuation-in-part of application Ser. No. 538,459, filed Mar. 23, 1966, and now Pat. No. 3,421,222.

BACKGROUND

The invention pertains to the field of dentistry particularly to a dispenser for dental filling material.

In the above-mentioned parent application there is disclosed a method for filling dental cavities in which a tooth form is secured over a cavity, an opening is provided in the form, a tubular barrel is inserted through the opening, and the filling material is introduced through the barrel and into the cavity. The present invention is directed to apparatus for dispensing the filling material and which may be used to perform part of the aforementioned process. It is desirable to be able to fill cavities by mechanical apparatus rather than by inserting the filling material by a hand operation. It is also desirable to fill dental cavities more quickly and easily, and thus more economically, than heretofore.

SUMMARY

The present invention relates to an apparatus for filling a cavity in a tooth and more particularly to a dispenser for dental filling material.

It is an important object of this invention to provide a new and useful apparatus for filling cavities in teeth faster and easier than heretofore.

A further object of this invention is to provide a new and useful dispenser which rapidly dispenses a flowable filling material.

A yet further object is the provision of a filling material dispenser in accordance with the above object and which has removable means in which the filling material may be prepared.

Another object of the present invention is to provide an apparatus for dispensing dental filling material and which utilizes air under pressure as the dispensing force.

Other objects and advantages of this invention will become apparent as the same becomes better understood by reference to the following specification taken in conjunction with the accompanying darwings.

DRAWING

FIG. 1 is a view, in part perspective and in part diagrammatic, which illustrates the apparatus of the present invention being used to fill a cavity in an anterior tooth;

FIG. 2 is a partial sectional view taken generally along line 2—2 of FIG. 1;

FIG. 3 is a large-scale, longitudinal sectional view of one embodiment of dispenser for filling material constructed in accordance with the present invention;

FIG. 4 illustrates a tool for securing a barrel to the end of a dispenser, and on a still larger scale than FIG. 3;

FIG. 5, on the same scale as FIG. 4, illustrates a tool for removing the barrel and cartridge from the end of the dispenser after use;

FIG. 6 is a large-scale, longitudinal sectional view of another embodiment of the present invention;

FIG. 7 is a view similar to FIG. 6, but showing the relationship of the parts in a dispensing position;

FIGS. 8–11 are cross-sectional views taken respectively along lines 8—8, 9—9, 10—10, and 11—11 of FIG. 6; and FIG. 12 is a cross-sectional view taken along line 12—12 of FIG. 6 but on double scale.

DESCRIPTION

Reference is now made more particularly to the drawings wherein similar reference characters indicate similar parts throughout the several views. A plurality of anterior teeth 20–22 are illustrated in FIG. 1 and tooth 21 is shown as having a cavity 21a. The apparatus of the present invention is particularly adapted for repairing such cavities or for restoring damaged teeth. For example, the apparatus may be used for repairing the incisal edge of a tooth; or it may be utilized for crowning a tooth, or other repairing applications as disclosed in greater detail in the aforementioned parent application. Such repairs, in general, may hereinafter be sometimes referred to as cavities and it should be understood that this term may include any condition of a tooth which requires repair. While the drawings indicate repairing a cavity in an anterior tooth, this is for illustrative purposes only and it should be understood that the present invention is not so limited.

Following the preparation of the cavity, a form is secured in position over the cavity. The type of form used depends on the character or type of cavity being filled. For example, if the cavity is in the side of the tooth, a matrix strip 32 may be used. After the matrix is secured into position, the cavity is ready to be filled. A particularly advantageous dispenser for this purpose is described below.

One preferred embodiment of a filling material dispenser, generally designated 70, is illustrated in FIG. 3. The dispenser has a generally cylindrical elongate body portion 72 having an internal compartment 74 adjacent its left end, as viewed in FIG. 3. A removable cartridge is disposed in the compartment 74 for holding the filling material and includes a preferably tubular body portion 76 and having a piston disposed therein. The piston includes a tapered rubber plunger 78 and a plastic insert 79. The rubber plunger is movable toward the left end of the compartment to force the filling material out of the compartment and has annular flanges 78a, 78b (FIG. 5) in engagement with the inner wall of body 76 to generally provide a seal therewith and force substantially all the material out the compartment.

A closure assembly, generally designated 81, is arranged to overlie the end of the body 72 and has a cap or closure 82 and a neck portion 83 for insertion between the body and the cartridge. Bayonet slots 84 are provided in the body 72 for receiving pins 85 to hold the closure assembly at the end of the dispenser and to tighten the cartridge body 76 against the rear side of compartment 74. Closure 82 has an opening 86 therein, through which extends a cartridge closure. As shown, the cartridge closure includes a cover portion 91 flaring outwardly from the cartridge at an angle generally complementary to the surface of the plunger 78. In this manner the plunger may force substantially all the material from the cartridge. A hollow neck portion 92 communicates with the cartridge and is generally co-axial with the cartridge inner surface. A neck engaging member 93 is frictionally secured to the neck portion 92 and has a barrel 94 extending therefrom. The outer diameter of barrel 94 is advantageously less than the size of the cavity, and the inside diameter is of a size sufficient for passage of a flowable filling material therethrough. The extremity of barrel 94 may be generally square, as shown, or tapered slightly to provide a sharp cutting edge for easily piercing the matrix strip.

Closure 82 has a generally U-shaped spring 87 thereon and adjacent one end of neck 83 for engaging and supporting cover portion 91 in position. For this purpose, a tool 102 is provided. The tool comprises a base portion 103 and a generally upright head 104 on the base. Head 104 has a diameter approximately that of cartridge body 76 for engaging cover portion 91. The neck and barrel assembly is loosely inserted through opening 86 and inverted on tool 102, as shown in FIG. 4. Cover portion 91 is engaged and held by spring 87 by movement of closure 82 in a direction indicated by arrow 105 in FIG. 4.

FIG. 5 illustrates another tool, generally designated 106, for use in removal of the barrel and neck assembly after the dispenser has been used for filling a cavity. Second tool 106 includes a base 107 and a generally upright tubular body 108 attached thereto. Tubular body 108 has an inner diameter sufficient for receiving neck engaging portion 93 therebetween and has a length sufficient so that its upper end may engage flange 93a of the tube engaging portion 93. After use of the dispenser, the cartridge is advantageously removable from the cavity along with the closure assembly 81. Thus, for removal of the neck and barrel assembly and the cartridge from closure 82, neck engaging portion 93 and barrel 94 are inserted into tubular member 108 until flange 93a engages the end of tubular member 108. Further movement of closure 82 in a direction indicated by arrow 109 disengages the neck and barrel assembly and the cartridge from the closure. The cartridge and the neck and barrel assembly are conveniently made of relatively inexpensive materials so that these portions may be discarded after use, thereby eliminating the necessity of cleaning any parts of the dispenser.

An exemplary means for dispensing materials through the barrel is illustrated in the right hand portion of FIG. 3 and is disposed in the hollow cylindrical portion of body 72. As illustrated, the body defines a second compartment 111 communicating with internal compartment 74 and a third compartment 113 communicating with second compartment 111. The third compartment has a larger diameter for a reason which will hereinafter become apparent. A plunger assembly, generally designated 115, is disposed in compartments 111 and 113 and includes a body portion 117 and a head portion 116, of slightly larger size, attached thereto. A first sleeve 118 is disposed around the left end of body 117 and a second sleeve 119 is attached to the right hand end thereof as by fastener 121. A compression type spring 122 is disposed around body 117 and extends between sleeves 118 and 119. The spring holds the plunger assembly in the position illustrated with the rear edge of head 116 engaged with sleeve flange 118'. The right hand end of dispenser body 72 is conveniently threaded for receiving a threaded closure 124 thereon. An insert 125, conveniently made of plastic, is held by the threaded closure and has a metal tube 126 extending therethrough. Tube 126 conveniently has a collar 127 disposed outside of insert 125 for reception of an air line coupling through which air may be fed under pressure to third compartment 113.

A supply of gas under pressure is usual in dentist offices and includes a supply S and a valve V disposed in an air line 128 (FIG. 1) which may be coupled to collar 127.

When the valve V is opened, air, conveniently under about 30 p.s.i. pressure, is fed through line 128 and tube 126 into third compartment 113. A gasket 131 is mounted on second sleeve 119 and is arranged to engage the surface of third compartment 113 whereby the air pressure will cause the plunger to move into engagement with piston insert 79 and dispense material through the barrel. At the extremity of movement, sleeve 119 will engage sleeve 118 thereby controlling the movement of head 116 and preventing any excessive pressure against closure assembly 81. An air vent 133 is provided in body 72 and communicates with second chamber 111. The air vent relieves any compression during movement of the plunger for dispensing, and relieves the interior to atmosphere when air pressure is removed, thereby allowing the plunger assembly to return the position illustrated.

Another preferred embodiment of a filling material dispenser is illustrated in FIGS. 6–12. Similar parts, having the same function as parts in the above-described embodiment, are indicated by the same reference numerals followed by the postscript prime ('), and further description is deemed unnecessary.

In this embodiment, cartridge body portion 76' has a V-shaped extremity to fit into a complementary shaped groove in cartridge closer 91'. In this manner, a better seal is provided between these parts and provides further assurance against leakage at the juncture thereof. It will also be noted that the barrel 94' is fitted into the neck portion 92' to provide a more compact assembly.

This embodiment illustrates another means for dispensing materials through the barrel 94', and the mechanism is illustrated in the right hand portions of FIGS. 6 and 7. As shown, a wall 136 divides the interior of the body 72' into the compartments 74' and 111'. A plunger assembly, generally designated 140, includes a member 142 of generally U-shaped cross-section and movable through an opening in the wall 136 to engage piston insert 79'. Member 142 has a shoulder 142a and a compression-type spring 144 disposed between the shoulder and wall 136 to resiliently urge member away from the piston insert 79'. A rotatable shaft has a head portion 146 disposed in member 142, a threaded intermediate portion or worm 147, and a rear portion 148. A collar 149 is affixed to rear portion 148 for engaging the end of a drive member 152 in retracted position (FIG. 6). Rear portion 148 has an elongated keyway 148a into which extends key 152a to provide a driving connection between the drive member and the shaft but yet allow the shaft to move longtiudinally in the body 72'.

An apparatus or motor is provided for rotating the drive member 152. Housing members 154, 155 define an enlarged compartment 158 at the rear end of the dispenser. A turbine 162 having vanes 162a is affixed to a geared shaft 164 (see FIG. 8) which is rotatably mounted on bearings 165, 166 (see FIG. 6). A plurality of gears 167–169 (FIG. 9) are rotatably mounted on a plate 172, conveniently secured to housing member 154. Gears 167–169 are engaged with geared shaft 164 and with a gear ring 152b secured to drive member 152. This provides a gear train with a preselected reduction ratio to drive the drive member 152 from air turbine 162.

Turbine 162 is conveniently rotated by air from the above-mentioned source S and directed against the vanes 162a. Air is supplied through the line 128 to tube 126'. A laterally extending passage 174 (see FIG. 11) extends through housing member 155 and into tube 126'. The passage is arranged to direct the air against the vanes 162a on the turbine to drive the same. Other openings 175–177 (FIG. 11) are provided in housing member 155 and head to an exhaust chamber 182 in a ring 184 attached to the rear side of housing member 155. Openings 186 communicate the chamber 182 with atmosphere, and a porous material 188 overlies the openings to serve as a muffler.

A clutching arrangement is provided for selectively advancing the shaft longitudinally of the body to move the cartridge piston and dispense the material. As shown, the clutching arrangement includes two generally L-shaped members 190. These clutching members are located on diametrically opposite sides of the shaft and are pivotally mounted on shaft 192. Leaf springs 194 resiliently urge the clutching members to a disengaged position as shown in FIG. 6. An outwardly extending leg 190a passes through an opening 195 in body 72' and terminates in a finger-grip surface 190b (see FIG. 12). A threaded surface 190c, like a sector nut, is arranged for engaging the threaded intermediate portion 147 of the shaft when the clutching members 190 are moved to an engaged position as shown in FIG. 7. When in the position of FIG. 7, rotation of the turbine 162 causes longitudinal advancement of the shaft as it rotates. Obviously, manual release of the clutching members ceases this advancement. When the shaft approaches the extremity of longitudinal movement, an inclined surface 198 (see FIG. 7) on the rear portion 148 of the shaft disengages the clutching members 190. Such automatic disengagement preferably occurs when substantially all of the filling material has been dispensed from the cartridge.

A suitable material for use in the method is "Bonfil" sold by L. D. Caulk Co. of Milford, Del. This material, when mixed in accordance with instructions, is readily flowable and lends itself for use in the present invention. The removable cartridge may advantageously be used as a receptacle for mixing the material preparatory to use. It can be seen that the cartridge can stand upright on its right end, as viewed in FIGS. 3 and 6. Also, its opposite end is generally open to provide access for the insertion of materials to be mixed. The tight seal provided by flanges 78a, 78b on plunger 78 prevents the loss of material during such mixing.

It is now deemed obvious that the above described apparatus can be utilized to quickly and easily fill dental cavities. As illustrated in FIG. 1, a matrix strip is secured in position, and the tubular barrel 94, which has an outer dimension less than the size of the cavity, is inserted through an opening in the form and into the cavity. A flowable filling material, as at 135 in FIG. 2, is dispensed through the tubular barrel and into the cavity. Since the barrel is disposed inside the cavity, it can be readily seen that the first amount of material dispensed will be dispensed in the rear portion of the cavity and thus the cavity is filled from its inner portion toward the tooth surface, and all air is forced out by the filling material 135. While maintaining pressure on the plunger 78, the barrel is removed from the cavity and the opening is preferably reclosed to provide a substantially smooth outer surface of the filling material. After proper curing time, the matrix may be removed. Reference is made to the aforementioned parent application for a more complete description of procedures for filling cavities.

While preferred embodiments of the present invention have been described, this has been done by way of illustration and not limitation, and it is to be understood that various modifications in structure will occur to persons skilled in the art.

What is claimed is:

1. A dispenser for dispensing dental filling material in a plastic state into a cavity in a tooth comprising: an elongate body adapted to be grasped by the hand of a user; the body having an internal compartment at the front end thereof for receiving the dental filling material; a barrel at the front end communicating with the compartment and having an internal passageway of sufficient size for the passage of the filling material from the compartment; the barrel having an outer end portion having a size less than the size of the cavity so the end portion can be inserted into the cavity; a wall in the compartment and movable toward the barrel to dispense the dental filling material through the barrel; a plunger in the body rearwardly of the wall and having a threaded portion; the plunger movable in one longitudinal direction for engaging the wall and moving the same for dispensing; a spring acting to retract the plunger; and means for selectively moving the plunger in said one direction against the force of the spring and including: a rotatable member operatively connected to the plunger to rotate at least the threaded portion thereof, and clutching means on the body for selectively engaging the threaded portion of the plunger and for advancing the plunger toward the barrel as the plunger is rotated, whereby the rotary motion is changed to longitudinal motion for dispensing the filling material.

2. A dispenser for dental filling material as set forth in claim 1 including means on the plunger for disengaging the clutching means when the wall has been moved in the one longitudinal direction generally the full length of the compartment.

3. A dental handpiece for dispensing dental filling material in a plastic state into a cavity in a tooth, comprising in combination: an elongated, hollow body adapted to be grasped by the hand of a user; the inside of the body having means providing a stop spaced from one end thereof and defining an internal compartment between the stop and the one end; the body having an opening at the one end for providing access to the compartment; a removable cartridge for holding the dental filling material and having a size approximating that of the compartment; the cartridge adapted for insertion and removal through the body opening and, when inserted, having a first end adjacent the body opening and a second end engaged with the stop; the first end of the cartridge being initially open; a cartridge closure for overlying the first end of the cartridge; holding means attached to the body and engaged with the cartridge closure for holding the cartridge closure in position overlying the first end of the cartridge and for holding the cartridge in the compartment; the holding means including a removable closure assembly having an opening therethrough and overlying the one end of the body and including means for engaging and holding the cartridge closure thereon; a fastener for selectively attaching the closure assembly to the body; a barrel carried by the cartridge closure and passing through the opening in the removable closure assembly and having an outer dimension less than the size of the tooth cavity; the barrel communicating with the interior of the cartridge for passage of the filling material through the barrel into the tooth cavity; the cartridge including a wall adjacent the second end and movable toward the first end for dispensing the filling material through the barrel; and means in the body for moving the wall.

4. The combination of claim 3 wherein: the removable cartridge has a generally tubular inner surface terminating at its first end; and the wall comprises a piston contiguous to the inner surface and movable therealong during dispensing; whereby the second end of the removable cartridge is engaged with the stop at all times.

5. A dental handpiece for dispensing dental filling material as set forth in claim 3 wherein the means for moving the wall includes: a member disposed in the hollow body and engageable with the wall; and a motor on the body and having a driving connection to the member to move the member toward the one end of the body as the motor is rotated.

6. A dental handpiece for dispensing material including an elongated, hollow body adapted to be grasped by the hand of a user and having front and rear ends; the body having an internal compartment adjacent the front end thereof for receiving the material to be dispensed; a barrel communicating with the compartment and extending from the front end of the body; and means for forcing the material from the compartment through the barrel and comprising: an elongated plunger disposed in the hollow body and having a portion thereof threaded, a motor at the rear end of the body and operatively connected to the plunger to rotate the threaded portion thereof, manually operable clutching means including a segment nut selectively engageable with the threaded portion of the plunger to advance the plunger toward the front end as the plunger is rotated, the clutching means including means for normally urging the segment nut to a disengaged position and means for holding the segment nut in a fixed longitudinal relationship relative to the body when engaged with the threaded portion, whereby the clutching means is selectively operable to engage the segment nut with the threaded portion to change the rotary motion to longitudinal motion of the plunger.

7. A dental handpiece as set forth in claim 6 and including means on the plunger for disengaging the clutching means when the plunger has been moved to the extremity of its longitudinal movement toward the front end.

8. A dental handpiece for dispensing dental filling material in a plastic state into a cavity in a tooth, comprising in combination: an elongated, hollow body having front and rear ends and adapted to be grasped by the hand of a user; the inside of the body having means providing a stop spaced from the front end thereof and defining an internal compartment between the stop and the front end; the body having an opening at the front end for providing access to the compartment; a removable cartridge for holding the dental filling material and having a size approximating that of the compartment; the cartridge adapted for insertion and removal through the body opening and, when inserted, having a first end adjacent the body opening and a second end at all times engaged with the stop; the first end of the cartridge being initially open; a cartridge closure for overlying the first end of the cartridge; holding means attached to the body and engaged with the cartridge closure for holding the cartridge closure in position overlying the first end of the cartridge and for holding the cartridge in the compartment; a barrel carried by the cartridge closure and having an outer dimension less than the size of the tooth cavity; the barrel communicating with the interior of the cartridge for passage of the filling material through the barrel into the tooth cavity; the cartridge having a generally tubular inner surface terminating at the first end and including a resilient piston contiguous to the inner surface; the resilient piston being initially adjacent the second end of the cartridge and movable along the inner surface toward the first end for dispensing the filling material through the barrel; a plunger in the hollow body rearwardly of the cartridge and engageable with the resilient piston; means for feeding gas under pressure to the hollow body to move the plunger toward the front end of the body and against the resilient piston to thereby move the resilient piston and dispense the filling material; and means engaged with the plunger for resiliently urging the plunger toward the rear of the body.

References Cited

UNITED STATES PATENTS

| | | | |
|---|---|---|---|
| 1,776,659 | 9/1930 | Geffon et al. | 222—389 |
| 1,965,271 | 6/1934 | Wharton | 222—390 |
| 2,183,013 | 12/1939 | Davis | 222—389 |
| 2,505,028 | 4/1950 | Boeger | 32—60 XR |

ROBERT PESHOCK, Primary Examiner